United States Patent
Izadi-Zamanabadi et al.

(10) Patent No.: US 9,416,999 B2
(45) Date of Patent: Aug. 16, 2016

(54) METHOD FOR DETERMINING WIRE CONNECTIONS IN A VAPOUR COMPRESSION SYSTEM

(75) Inventors: Roozbeh Izadi-Zamanabadi, Soenderborg (DK); Lars Finn Sloth Larsen, Sydals (DK); Claus Thybo, Soenderborg (DK)

(73) Assignee: Danfoss A/S, Nordborg (DK)

( * ) Notice: Subject to any disclaimer, the term of this patent is extended or adjusted under 35 U.S.C. 154(b) by 451 days.

(21) Appl. No.: 13/378,835

(22) PCT Filed: Jun. 17, 2010

(86) PCT No.: PCT/DK2010/000094
§ 371 (c)(1),
(2), (4) Date: May 4, 2012

(87) PCT Pub. No.: WO2010/145657
PCT Pub. Date: Dec. 23, 2010

(65) Prior Publication Data
US 2012/0216553 A1    Aug. 30, 2012

(30) Foreign Application Priority Data

Jun. 19, 2009 (DK) ................................ 2009 00753

(51) Int. Cl.
  *F25B 49/00* (2006.01)
  *G05B 23/02* (2006.01)
  *F24F 11/00* (2006.01)

(52) U.S. Cl.
  CPC ........... *F25B 49/005* (2013.01); *F24F 11/0009* (2013.01); *G05B 23/0216* (2013.01);
  (Continued)

(58) Field of Classification Search
  CPC ............... F25B 49/005; F24F 11/0009; F24F 2011/0043; F24F 11/0012; F24F 2011/0045; F24F 2221/32; G01R 19/12; G01R 31/40; G05B 23/0216; G05B 23/0218
  USPC ......... 62/125, 126, 127, 129; 324/66; 702/58, 702/59
  See application file for complete search history.

(56) References Cited

U.S. PATENT DOCUMENTS 3,686,954 A * 8/1972 Motl ..................... G01M 13/00
                                                          116/220
5,009,076 A * 4/1991 Winslow ............... F25B 49/005
                                                           62/129
(Continued)

FOREIGN PATENT DOCUMENTS

CN          1282854 A       2/2001
CN          1538118 A      10/2004
(Continued)

OTHER PUBLICATIONS

International search report for PCT/DK2010/000094 dated Sep. 22, 2010.

*Primary Examiner* — Allen Flanigan
*Assistant Examiner* — Kun Kai Ma
(74) *Attorney, Agent, or Firm* — McCormick, Paulding & Huber LLP

(57) ABSTRACT

A method for determining wire connections in a vapor compression system (1) is disclosed. The vapor compression system comprises a compressor, a condenser, an expansion device (2) and an evaporator (3) being fluidly interconnected in a refrigerant path, and two or more sensor devices (7, 8, 9, 10, 11) arranged for measuring variables which are relevant for the operation of the vapor compression system (1). The method comprises the steps of changing an operational setting, e.g. an opening degree of the expansion device (2) for the vapor compression system (1), monitoring variable values, such as temperatures, being measured by at least two sensor devices (7, 8, 9, 10, 11), e.g. arranged at various positions of the vapor compression system (1), in response to said changed operational setting, comparing the measured variable values to expected behavior of at least one variable measured by a sensor device (7, 8, 9, 10, 11) in response to said changed operational setting, and based on the comparing step, determining at least one wire connection of the vapour compression system (1). The method allows correct wire connections to be established without any special effort from the installing personnel, and without requiring rewiring of the system.

12 Claims, 3 Drawing Sheets

(52) U.S. Cl.
CPC ......... *G05B23/0218* (2013.01); *F24F 11/0012* (2013.01); *F24F 2011/0043* (2013.01); *F24F 2011/0045* (2013.01); *F24F 2221/32* (2013.01)

(56) References Cited

U.S. PATENT DOCUMENTS

| | | | |
|---|---|---|---|
| 6,293,118 B1 | 9/2001 | Oh | |
| 6,532,754 B2 * | 3/2003 | Haley | F25B 49/022 62/129 |
| 6,840,052 B2 * | 1/2005 | Smith | F24F 11/001 236/94 |
| 7,244,294 B2 * | 7/2007 | Kates | F24F 3/1603 116/268 |
| 7,349,824 B2 * | 3/2008 | Seigel | F24F 11/0086 62/125 |
| 7,823,397 B2 * | 11/2010 | Chang | F24F 1/26 137/557 |
| 8,205,461 B2 * | 6/2012 | Johnston | B60H 1/00585 62/125 |
| 8,418,483 B2 * | 4/2013 | McSweeney et al. | 62/126 |
| 2002/0184898 A1 * | 12/2002 | Chen | 62/127 |
| 2003/0019221 A1 * | 1/2003 | Rossi | F25B 49/005 62/127 |
| 2003/0051490 A1 * | 3/2003 | Jayanth | 62/127 |
| 2005/0005619 A1 | 1/2005 | Kojima et al. | |
| 2009/0049850 A1 * | 2/2009 | Kim | F24F 1/26 62/159 |
| 2009/0056036 A1 * | 3/2009 | Herkle et al. | 8/149.3 |
| 2009/0255278 A1 * | 10/2009 | Taras et al. | 62/115 |
| 2011/0110501 A1 * | 5/2011 | Hoy | H04M 3/30 379/22.03 |

FOREIGN PATENT DOCUMENTS

| | | |
|---|---|---|
| CN | 101373094 A | 2/2009 |
| EP | 0426450 A2 | 5/1991 |
| EP | 0426450 A2 * | 5/1991 |
| EP | 2028426 A1 * | 2/2009 |
| KR | 1020070031652 | 7/2007 |
| WO | 2007130051 A1 | 11/2007 |
| WO | WO 2007130051 A1 * | 11/2007 |
| WO | WO 2009086493 A2 * | 7/2009 |

\* cited by examiner

METHOD FOR DETERMINING WIRE CONNECTIONS IN A VAPOUR COMPRESSION SYSTEM

CROSS REFERENCE TO RELATED APPLICATIONS

This application is entitled to the benefit of and incorporates by reference essential subject matter disclosed in International Patent Application No. PCT/DK2010/000094 filed on Jun. 17, 2010 and Danish Patent Application No. PA 2009 00753 filed Jun. 19, 2009.

FIELD OF THE INVENTION

The present invention relates to a method for determining wire connections in a vapour compression system, such as a refrigeration system, a heat pump or an air condition system. In particular, the method of the invention may be used for determining wires connecting one or more sensor devices and a control unit of a vapour compression system and/or for determining wires connecting one or more actuators and a control unit of a vapour compression system.

BACKGROUND OF THE INVENTION

In a vapour compression system, such as a refrigeration system, a heat pump or an air condition system, a number of wires are connected between various components of the vapour compression system, e.g. wires interconnecting various sensors and a control unit and/or wires interconnecting various actuators and the control unit. It is important that these wires are connected correctly in order to ensure appropriate operation of the vapour compression system.

EP 0 426 450 A2 discloses a method of wiring/piping confirmation of a multiple air conditioner. A plurality of internal units is actuated manually or automatically or by remote control, a refrigerant pipe for a single internal unit is opened and the resulting change is detected by the internal unit. The changing data is returned to the controller. The controller confirms the correspondence relationship between the wiring that has received the data or the identification number of the internal unit and the opened piping. This process is repeated with respect to each internal unit. Thereby a correspondence between piping and wiring is sequentially determined for each of the units.

SUMMARY OF THE INVENTION

It is an object of embodiments of the invention to provide a method for determining wire connections in a vapour compression system, in which correct wiring of the vapour compression system can be ensured in an easy manner.

It is a further object of embodiments of the invention to provide a method for determining wire connections in a vapour compression system, in which correct wiring of the vapour compression system can be ensured without requiring reconnection of wires.

It is an even further object of embodiments of the invention to provide a method for determining wire connections in a vapour compression system, in which two or more wire connections of the vapour compression system may be determined simultaneously.

It is an even further object of embodiments of the invention to provide a method for determining wire connections in a vapour compression system, in which incorrect assignment of measurement channels in a control unit can be avoided.

The invention provides a method for determining wire connections in a vapour compression system, the vapour compression system comprising a compressor, a condenser, an expansion device and an evaporator being fluidly interconnected in a refrigerant path, and two or more sensor devices arranged for measuring variables which are relevant for the operation of the vapour compression system, the method comprising the steps of:

changing an operational setting for the vapour compression system, monitoring variable values being measured by at least two sensor devices, in response to said changed operational setting, comparing the measured variable values to expected behaviour of at least one variable measured by a sensor device in response to said changed operational setting, and based on the comparing step, determining at least one wire connection of the vapour compression system.

In the present context the term 'vapour compression system' should be interpreted to mean any system in which a flow of refrigerant circulates and is alternatingly compressed and expanded, thereby providing either refrigeration or heating of a volume. Such systems include, but are not limited to, a refrigeration system, an air condition system, a heat pump, etc.

The compressor may be a single compressor, but it could also be two or more compressors, e.g. forming a compressor rack. In any event, at least one of the compressor(s) may be a variable speed compressor.

The evaporator may be in the form of a single evaporator, or it may be two or more evaporators arranged fluidly in parallel. Each evaporator may comprise a single evaporator coil, or it may comprise two or more evaporator coils arranged fluidly in parallel.

Similarly, the condenser may be in the form of a single condenser, or it may be two or more condensers arranged fluidly in parallel.

The expansion device is a device which expands the refrigerant before the refrigerant enters the evaporator. It may, e.g., be in the form of an expansion valve. Alternatively or additionally, the expansion device may be or comprise a fixed orifice, a capillary tube and/or any other suitable kind of expansion device.

A vapour compression system normally operates in the following manner. Fluid medium, such as refrigerant, is compressed in the compressor. The compressed fluid is supplied to the condenser where it condenses, i.e. it leaves the condenser in a substantially liquid state. The fluid medium is expanded in the expansion device before it is fed to the evaporator, where the liquid part of the fluid medium is at least partly evaporated.

In the present context the term 'wire connection' should be interpreted to mean a wire interconnecting two parts of the vapour compression system, such as a sensor device and an input channel of a control unit, an actuator and an output channel of a control unit, or another similar kind of connection. The wire connection may be a hard wired connection. Alternatively, the connection between two parts may be established by means of a wireless communication channel.

The vapour compression system further comprises two or more sensor devices arranged for measuring variables which are relevant for the operation of the vapour compression system. Such sensor devices may, e.g., be temperature sensors measuring the temperature of the fluid medium at various positions along the refrigerant path, or an air temperature in the vicinity of the vapour compression system, such as the temperature of a secondary air flow across the evaporator or the condenser, or the temperature of a refrigerated or heated volume. Another example of a sensor device is a pressure sensor arranged for measuring the pressure of fluid medium at a specific position along the refrigerant path.

The variables which are measured by means of the sensor devices are of a kind which is relevant for the operation of the vapour compression system, and they may be control parameters used during control of the operation of the vapour compression system. Other suitable variables may be entities which behave in a significant manner in response to certain changes in operational settings.

When performing the method according to the invention, an operational setting for the vapour compression system is initially changed. This may, e.g., include changing an opening degree of an expansion valve, changing the speed of a fan causing a secondary flow across the evaporator or the condenser, activating or deactivating a defrost element, and/or any other suitable kind of change which has a significant influence on the operation of the vapour compression system.

During this, variable values being measured by at least two sensor devices are monitored, thereby detecting the behaviour of the measured variables in response to the changed operational setting. This detected behaviour is then compared to expected behaviour of at least one variable. For instance, in the case that the change in operational setting is an increase in opening degree of the expansion valve, then the temperature of, e.g., the refrigerant leaving the evaporator, and the temperature of a secondary air flow across the evaporator are expected to decrease. Furthermore, the temperature of the refrigerant leaving the evaporator is expected to decrease faster than the temperature of the secondary air flow across the evaporator, and the temperature of air leaving the evaporator is expected to be lower than the temperature of air entering the evaporator. Thus, comparing temperature measurements performed by means of sensor devices arranged at various positions of the vapour compression system to such expected behaviour of specific temperatures, it is possible to establish a correspondence between a given sensor and a given measured temperature signal. In the example given above, correspondence between three sensor devices and three measured signals can be simultaneously established.

Alternatively or additionally, the determined wire connection may be a wire connection between a control unit and an actuator. For instance, in the case that the changed operational setting is switching on a fan arranged for causing a secondary air flow across the evaporator, then a different behaviour of the various temperatures of the system is expected than the one described above. Accordingly, monitoring the measured temperatures it can be established whether an actuation signal given by the control unit causes an increase in opening degree of the expansion valve or an increase in rotational speed of the fan. Thus, based on the comparison of the measured variables and the expected behaviour a correspondence between an output connection of the control unit and an actuator, e.g. an actuator for the expansion valve or an actuator for the fan, can be established.

Accordingly, at least one wire connection, e.g. between a given sensor device and a given input of a control unit, can be determined on the basis of the comparing step, and information regarding the determined wire connection can be stored in the system and used during normal operation of the vapour compression system. Accordingly, correct wiring of the vapour compression system can be ensured without the requirement of rewiring of the system. Furthermore, installation of the vapour compression system is very easy, since the person performing the installation can simply connect the wires more or less randomly, and the correspondence between a given sensor or actuator and a given input or output connection of the control unit can be determined subsequently, thereby ensuring proper operation of the vapour compression system.

The step of determining at least one wire connection may comprise determining at least one wire connection between a given sensor device and a control unit. As described above, this may include establishing a correspondence between a given sensor, e.g. a temperature sensor, and a given input connection of the control unit, e.g. in the manner described above.

Alternatively or additionally, the step of determining at least one wire connection may comprise determining at least one wire connection between an actuator connected to a component of the vapour compression system and a control unit. According to this embodiment, it is determined which actuator was actuated during the step of changing an operational setting for the vapour compression system, e.g. as described above.

The step of determining at least one wire connection may comprise determining the position of at least one sensor device. According to this embodiment, the step of determining at least one wire connection may comprise establishing that a given temperature measurement arises from a temperature sensor arranged at a specific position in the vapour compression system, e.g. at the outlet of the evaporator, at or near the evaporator wall, inside a refrigerated or heated volume, in a secondary air flow across the evaporator, either before or after passing the evaporator, or in any other suitable position where an appropriate temperature can be measured.

The step of changing an operational setting for the vapour compression system may comprise changing an opening degree of the expansion device. In this case the expansion device may advantageously be or comprise an expansion valve. As described above, when the opening degree of the expansion device is changed, the temperatures measured at various positions of the vapour compression system are expected to behave in accordance with specific behaviour patterns, and by monitoring temperature measurements obtained by means of the two or more temperature sensors, and comparing the measurements to expected temperature behaviour, it can be determined to which sensor device a given measured temperature signal belongs.

As an alternative, other relevant operational settings may be changed, such as switching a fan on or off, switching a defrost element on or off, etc. Furthermore, the step of changing an operational setting may comprise a combination of any of these examples. This will be described further below.

The step of monitoring variable values may comprise monitoring dynamical behaviour of said variable values. According to this embodiment changes in the measured variables, and possibly rates of changes of the measured variables are monitored. Such changes and rates of changes are normally characteristic for sensors, such as temperature sensors, arranged at specific positions of the vapour compression system. Therefore it is suitable to monitor the dynamical behaviour of the variable values. The step of comparing may, in this case, comprise comparing the measured dynamical behaviour of said variable values to expected dynamical behaviour of at least one variable measured by a sensor device in response to said changed operational setting.

Alternatively or additionally to monitoring dynamical behaviour of the variable values, steady state values or stationary values of the variable values may be monitored, e.g. after a time interval has been allowed to lapse from the operational setting has been changed.

The method may further comprise the step of applying an electronic label to a determined wire connection. The electronic label allows the vapour compression system to recognise the determined wire connection, and this can be used during normal operation of the vapour compression system.

The method may further comprise the step of, based on the comparing step, determining an error state of an actuator connected to a component of the vapour compression system. In the case that the behaviour of the monitored variable values is different from the expected behaviour of the variable values in response to the change in operational setting, this may be an indication that the actuator which is supposed to initiate the change in operational setting is not operating properly. In this case the intended change in operational setting is not taking place, or is not performed as intended.

The method may further comprise the step of obtaining a signature for the vapour compression system, said signature reflecting expected behaviour of at least one variable measured by a sensor device in response to predefined changes in operational settings for the vapour compression system. The signature may reflect the expected behaviour of a variable measured by only one sensor device. Alternatively, the signature may reflect the expected behaviour of variables measured by two or more sensor devices. The signature may even reflect the expected behaviour of the variables measured by all of the sensor devices, in which case the signature reflects the total behaviour of the vapour compression system in response to a given change of an operational setting. The step of obtaining the signature may be regarded as a kind of 'calibration' of the method, and the comparing step is based on empirically obtained information about the behaviour of the vapour compression system.

The step of monitoring variable values may comprise monitoring at least two temperature parameters of the vapour compression system. According to this embodiment, the step of determining at least one wire connection may include comparing the two measured temperature parameters to each other as well as to expected behaviour. For instance, as mentioned above the temperature of the secondary air flow across the evaporator before the evaporator is expected to be higher than the temperature of the secondary air flow across the evaporator after the evaporator. Thus, if temperatures measured by two different sensor devices are monitored, it may be concluded that the higher temperature is measured by a sensor device arranged in the secondary air flow across the evaporator before the evaporator, while the lower temperature is measured by a sensor device arranged in the secondary air flow across the evaporator after the evaporator.

The method may further comprise the steps of:
changing an additional operational setting for the vapour compression system,
monitoring variable values being measured by at least two sensor devices, in response to said changed operational setting,
comparing the measured variable values to expected behaviour of at least one variable measured by a sensor device in response to said additional changed operational setting, and
based on the comparing step, determining at least one wire connection of the vapour compression system.

According to this embodiment, the method steps of the method are more or less repeated. However, the operational setting being changed is different from the operational setting which was changed initially. The method may, in this case, e.g. be performed in the following manner. Initially an actuator for the expansion device is activated in order to increase the opening degree of the expansion device. In the case that no changes are observed in the monitored variable values, it may, e.g., be because the valve is broken or in an error state, or because the valve is mounted in an incorrect manner, or that the actuator is connected incorrectly, i.e. the actuator for the expansion device has in fact not been activated, but another actuator may have been activated.

Subsequently, another actuator may be activated. Three possible scenarios may be seen in response to this.

In the case that a temperature starts increasing, it is likely that the actuator which was initially activated was connected to the fan causing a secondary air flow across the evaporator, and the actuator which was subsequently activated was connected to a defrost element.

In the case that a temperature starts decreasing, it is likely that the actuator which was initially activated was connected to the fan causing a secondary air flow across the evaporator, and the actuator which was subsequently activated was connected to the expansion device.

In the case that the temperatures remain unchanged, it is likely that an error is present in the system. For instance, the actuator for the expansion device may be broken or not properly connected. In any event, further investigations must be performed in order to properly locate the error.

BRIEF DESCRIPTION OF THE DRAWINGS

The invention will now be described in further details with reference to the accompanying drawings in which.

DETAILED DESCRIPTION OF THE PREFERRED EMBODIMENTS

Figure 1:
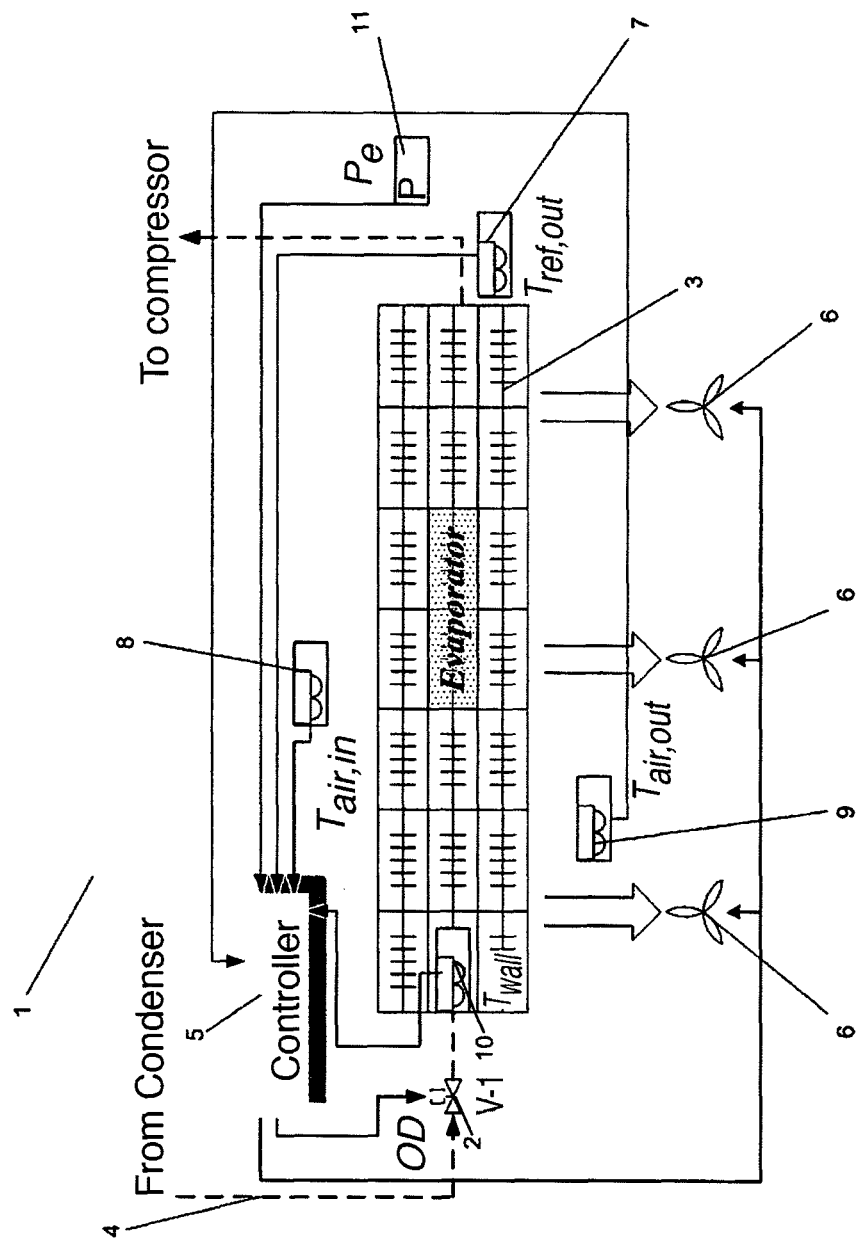
FIG. 1 is a diagrammatic view of a vapour compression system in which a method according to an embodiment of the invention may be used.

FIG. 1 is a diagrammatic view of a vapour compression system 1. The vapour compression system 1 comprises a compressor (not shown), a condenser (not shown), and expansion valve 2 and an evaporator 3 arranged in a refrigerant path 4. The vapour compression system 1 further comprises a controller 5 arranged for controlling the operation of the vapour compression system 1. Three fans 6 are arranged to cause a secondary air flow across the evaporator 3. The vapour compression system 1 may further comprise a defrost element (not shown) arranged for heating the evaporator 3 in the case that defrost is required.

A number of sensor devices are arranged at various positions in the vapour compression system 1. Temperature sensor 7 is arranged at the outlet opening of the evaporator 3, and it thereby measures the temperature of refrigerant leaving the evaporator 3, $T_{ref,\,out}$. The temperature measurements performed by temperature sensor 7 can advantageously be used during the normal operation of the vapour compression system 1. The superheat is defined as the temperature difference between the temperature of the refrigerant leaving the evaporator 3 and the dewpoint of the refrigerant. It is normally desired to control the vapour compression system 1 in such a manner that the superheat is as small as possible, but positive. Thereby the refrigeration capacity of the evaporator 3 is utilised to the greatest possible extent, while it is prevented that liquid refrigerant leaves the evaporator 3. In order to obtain this, the temperature measurements performed by temperature sensor 7 constitute an important control parameter.

Temperature sensor 8 is arranged in the secondary air flow across the evaporator 3 being caused by the fans 6. The temperature sensor 8 is arranged at a position before the air flow reaches the evaporator 3, and it thereby measures the temperature of air being supplied to the evaporator 3, $T_{air, in}$.

Temperature sensor 9 is also arranged in the secondary air flow across the evaporator 3 being caused by the fans 6. However, the temperature sensor 9 is arranged at a position after the air flow has passed the evaporator 3, and it thereby measures the temperature of air which has passed the evaporator 3, $T_{air, out}$. Since the evaporator 3 provides refrigeration for the secondary air flow during normal operation, the temperatures measured by temperature sensor 9 must be expected to be lower than the temperatures measured by temperature sensor 8.

Temperature sensor 10 is arranged at or near a wall part of the evaporator 3, near the inlet opening of the evaporator 3. The temperature sensor 10 thereby measures the temperature of the wall of the evaporator 3 in this position, $T_{wall}$. This temperature sensor 10 may advantageously be used in connection with defrosting of the vapour compression system 1. In the case of significant ice formation on the evaporator, the temperature measured by the temperature sensor 10 is low. Accordingly, a very low temperature measurement by the temperature sensor 10 indicates that defrost is required. When the defrost element is switched on, and the defrost process is thereby initiated, the temperature measured by temperature sensor 10 increases to 0° C. When the temperature measured by the temperature sensor 10 exceeds 0° C. it is an indication that the ice has melted, and that the defrost process has been completed. Accordingly, the defrost element can be switched off.

Pressure sensor 11 is arranged to measure the suction pressure of the vapour compression system.

Each of the sensor devices 7-11 communicates the measured signals to the controller 5. In response to received signals, the controller 5 sends actuation signals to the expansion valve 2, the fans 6 and/or the defrost element (not shown), thereby controlling the operation of the vapour compression system 1 in an appropriate manner.

The controller 5 is further adapted to perform the method steps of a method according to an embodiment of the invention. To this end the controller 5 initially sends an actuation signal, e.g. to the expansion valve 2, to the fans 6 and/or to the defrost element (not shown). An actuation signal sent to the expansion valve 2 will typically result in a change in the opening degree of the expansion valve 2, i.e. an increase or a decrease in the opening degree. An actuation signal sent to the defrost element (not shown) will typically result in the defrost element being switched either on or off. An actuation signal sent to the fans 6 will typically result in the fans 6 being switched either on or off. As an alternative, only one or some of the fans 6 may be switched on or off. As another alternative, the speed of each fan 6 may be variable, in which case the actuation signal may result in the speed of one or more of the fans 6 being increased or decreased. In any event, an actuation signal sent to the fans 6 will typically change the secondary air flow across the evaporator 3.

Subsequently the behaviour of the variables measured by the sensor devices 7-11, in response to the change in operational setting of the vapour compression system 1 caused by the actuation signal, is monitored. The monitored behaviour is then compared to the expected behaviour of, e.g. the temperatures measured by the temperature sensors 7-10. Since the temperatures $T_{ref, out}$, $T_{air, in}$, $T_{air, out}$ and $T_{wall}$, measured by temperature sensors 7, 8, 9 and 10, respectively, are expected exhibit distinctly different behaviour in response to the changes in operational setting described above, the comparison step will allow an operator to determine which temperature signal originates from which temperature sensor 7-10. This will be described in further detail below with reference to FIGS. 2-5. Accordingly, this method allows the actual configuration of the vapour compression system 1 to be determined, thereby ensuring that the obtained sensor signals are interpreted correctly during operation of the vapour compression system 1.

As an alternative, the monitored behaviour of the temperatures measured by the temperature sensors 7-10 may reveal which change in operational setting was caused by the actuation signal. In this case it can, e.g., be determined whether the actuator which received the actuation signal is connected to the expansion valve 2, the fans 6 or a defrost element (not shown). Actuation of these three elements will result in very different behaviour of the measured temperatures, and a wire connection between the controller 5 and a given actuator can therefore be determined on the basis of the comparing step.

Figure 2:
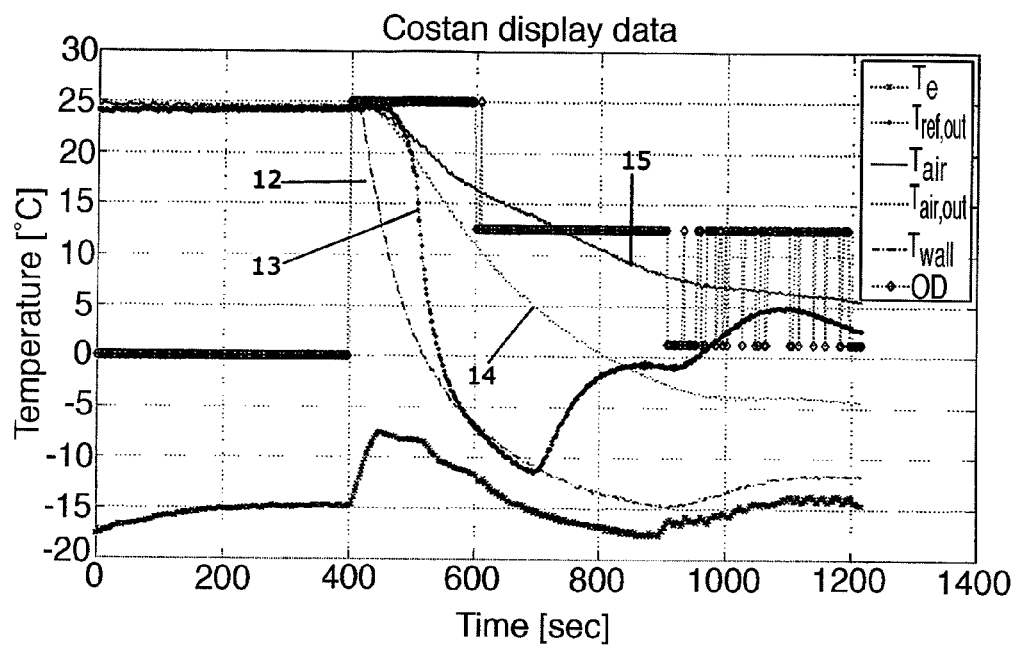
FIG. 2 is a graph illustrating variations of temperatures measured in a first vapour compression system in response to changes in opening degree of an expansion device.

FIG. 2 is a graph illustrating the behaviour of the variables detected by the sensor devices 7-11 shown in FIG. 1, in response to changes in the opening degree of the expansion valve 2. In the situation illustrated in FIG. 2 the fans 6 are switched on.

Initially the opening degree (OD) of the expansion valve 2 is zero, i.e. the expansion valve 2 is closed. It is clear from the graph that the temperatures $T_{ref, out}$, $T_{air, in}$, $T_{air, out}$ and $T_{wall}$ are kept substantially constant at the same temperature level. This is due to the fact that when the expansion valve 2 is closed, no refrigerant is fed to the evaporator 3, and hence no refrigeration takes place, and the temperatures $T_{ref, out}$, $T_{air, in}$, $T_{air, out}$ and $T_{wall}$ have therefore reached an equilibrium level determined by the ambient temperature.

The temperature $T_e$ is the evaporation temperature, i.e. the temperature at which the refrigerant evaporates in the evaporator 3. This temperature depends on the kind of refrigerant and on the pressure of the refrigerant, i.e. the suction pressure of the vapour compression system. Since the refrigerant is not changed during operation, $T_e$ is in fact a measure for the suction pressure, i.e. it is the measurement signal obtained by sensor device 11. It is clear from the graph that the suction pressure settles at a substantially constant level while the expansion valve 2 is closed. However, it should be noted that in the case that other evaporators are present in the vapour compression system 1, then the suction pressure may be affected by other evaporators being activated, i.e. $T_e$ will in this case not be stabilized at a substantially constant level. This situation will be described in further detail below with reference to FIG. 4. In any event, when the compressor is running and the expansion valve 2 is closed, then $T_e$ is substantially lower than any other temperature measured in the vapour compression system 1.

At t=400 s the opening degree (OD) of the expansion valve 2 is increased dramatically. This immediately causes the suction pressure, i.e. $T_e$, to increase, but after a while it slowly decreases. It should be noted that in some situations the increase in $T_e$ may be less dramatic than illustrated in FIG. 2, and $T_e$ may even not increase at all. This is because $T_e$ is a function of the available cooling capacity of the vapour compression system 1 and the compressor system.

Furthermore, all of the temperature signals start decreasing when the opening degree is increased. However, the temperatures decrease at very different rates. It must be expected that the two curves 12, 13 which decrease most rapidly represent $T_{wall}$ and $T_{ref,\,out}$, while the two remaining curves 14, 15 correspond to the two air temperatures, $T_{air,\,in}$ and $T_{air,\,out}$, because the air temperatures decrease in response to heat exchange with the evaporator 3, and that the temperatures which are directly related to the evaporator 3 therefore necessarily decreases more rapidly than the temperatures related to the secondary air flow across the evaporator 3.

Regarding the air flow temperatures 14, 15, the air leaving the evaporator 3 must be expected to have a lower temperature than the air entering the evaporator 3, since the air flowing across the evaporator 3 is refrigerated by the evaporator 3. Accordingly, it can be concluded that the curve 14 corresponds to $T_{air,\,out}$, while the curve 15 corresponds to $T_{air,\,in}$.

At t=600 s the opening degree (OD) is decreased, but the expansion valve 2 remains in an open state. This is because the curves 12 and 13 approach the evaporation temperature, $T_e$. In order to keep the superheat positive, thereby preventing that liquid refrigerant passes through the evaporator 3, $T_{ref,\,out}$ should not be allowed to fall below $T_e$. Since it is initially not known which of the temperature measurements corresponds to $T_{ref,\,out}$, this can be obtained by ensuring that none of the measured temperatures is allowed to fall below $T_e$. Hence, the opening degree (OD) of the expansion valve 2 is decreased when at least one of the temperature curves 12-15 approaches $T_e$, thereby reducing the amount of refrigerant supplied to the evaporator 3 and decreasing the risk of liquid refrigerant passing through the evaporator 3.

In response to the decreased opening degree (OD) the temperature of curve 13 increases at about t=700 s, while the temperature of curve 12 continues to decrease. As described above, the decrease in opening degree (OD) results in a reduced amount of refrigerant being fed to the evaporator 3, and consequently the temperature of the gaseous refrigerant leaving the evaporator 3 will increase. On the other hand, the temperature of the evaporator wall is unaffected by the decrease in opening degree (OD), due to the fact that the controller strategy ensures that at least one of the temperatures, in this case $T_{wall}$, lies within the proximity of $T_e$. Accordingly, the behaviour of curves 12, 13 reveals that curve 13 corresponds to $T_{ref,\,out}$, and that curve 12 corresponds to $T_{wall}$.

From t=900 s and onwards the vapour compression system 1 is operated in an ordinary manner, i.e. the opening degree (OD) of the expansion valve 2 is switched between two positions in a manner which ensures that the superheat is maintained at a low, but positive, level.

Figure 3:
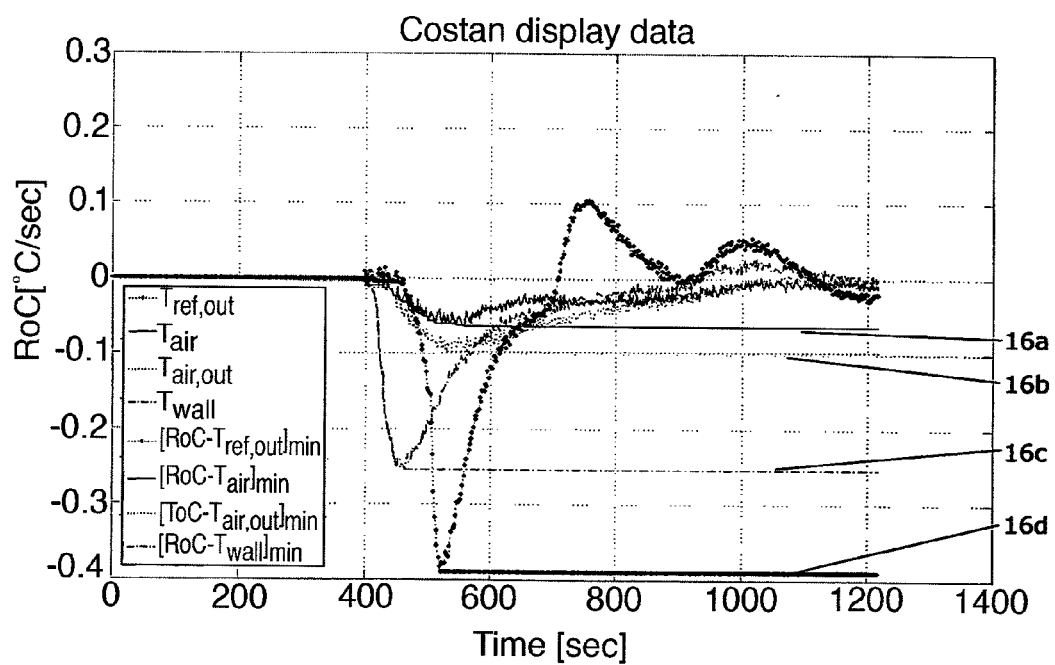
FIG. 3 is a graph illustrating rate of change of the temperatures illustrated in FIG. 2.

FIG. 3 is a graph showing the rate of change, i.e. the derivative with respect to time, of the temperature measurements shown in FIG. 2. Such curves also reflect the dynamics of the vapour compression system 1 and can advantageously be used when analysing the behaviour of the measured temperature values in response to a given change in operational setting, e.g. a change in opening degree of the expansion valve 2, as illustrated in FIG. 3, and/or activation or deactivation of the fans 6 and/or the defrost element. The lines 16a-16d represent the minimum values for the rate of change of each temperature curve. Comparing these minimum values to each other also provide information relating to the mutual behaviour of the measured temperatures. Such information can also be useful when determining a correspondence between a given measured signal and a given temperature sensor. Regardless of the behaviour of temperatures measured at various positions, e.g. during a start-up or following an opening of the expansion valve 2, the mutual levels of the minimum values for the rate of change of the temperature curves will always be the same under given actuation conditions. From the minimum values shown in FIG. 3 it can therefore be concluded that the highest minimum value 16a represents $T_{air,\,in}$, that the minimum value 16b represents $T_{air,\,out}$, that the minimum value 16c represents $T_{wall}$, and that the minimum value 16d represents $T_{ref,\,out}$.

Figure 4:
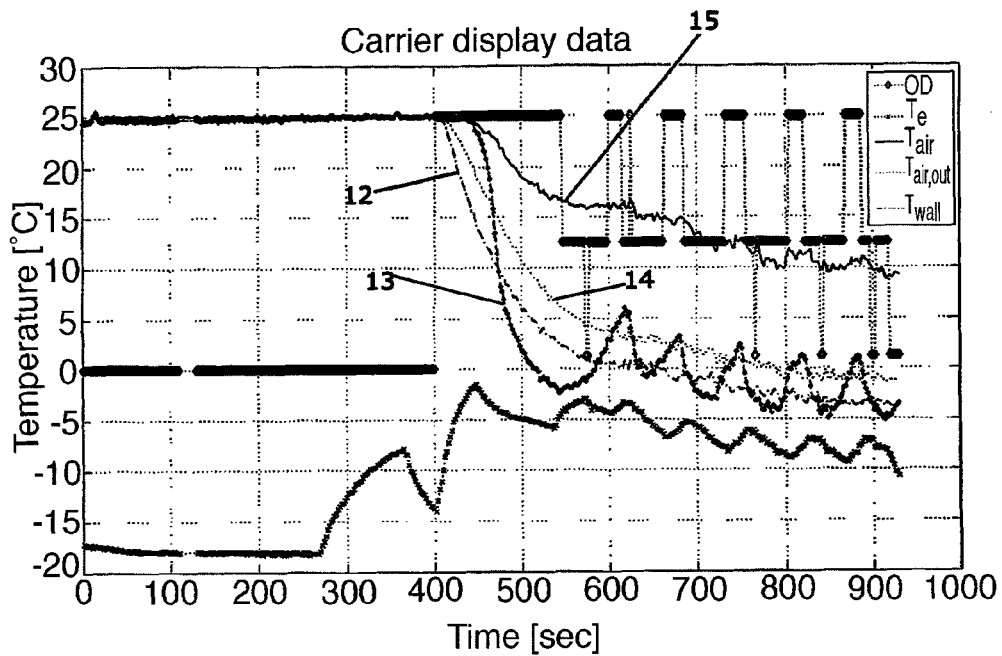
FIG. 4 is a graph illustrating variations of temperatures measured in a second vapour compression system in response to changes in opening degree of an expansion device.

FIG. 4 is a graph illustrating the behaviour of the variables detected by the sensor devices 7-11 shown in FIG. 1, in response to changes in the opening degree of the expansion valve 2. In the situation illustrated in FIG. 4 the fans 6 are switched on. In the example illustrated in FIG. 4, a slightly different vapour compression system 1 is operated than the one described with reference to FIG. 2. The behaviour of the temperature curves 12-15 shown in FIG. 4 is similar to the behaviour of the temperature curves 12-15 shown in FIG. 2, and it will therefore not be described in detail here.

At t=275 s $T_e$, and thereby the suction pressure, increases even though the opening degree (OD) of the expansion valve 2 is maintained at zero, i.e. the expansion valve 2 is in a closed state. This is because the vapour compression system 1 forms part of a larger system comprising two or more vapour compression entities, e.g. in the form of separate display cases, fluidly connected in parallel to the same compressor or compressor rack. In this case the suction pressure of a given vapour compression entity is affected when the opening degree of the expansion valve of one of the other refrigeration entities is increased. Accordingly, the increase in suction pressure at t=275 s illustrated in FIG. 4 may be caused by an increase in opening degree of an expansion valve of another vapour compression entity.

At t=400 s the opening degree (OD) of the expansion valve 2 is increased dramatically, and the subsequent behaviour of the measured temperatures is substantially as described above. From approximately t=540 s and onwards, the vapour compression system 1 is operated in a normal manner which ensures that the superheat is kept low, but positive. It can be seen from the figure, that even during this time period, the four temperature curves 12-15 behave in sufficiently distinct manners to allow each of them to be identified as originating from a specific temperature sensor, based on their dynamic behaviour. Accordingly, wire connections of the vapour compression system 1 may even be determined during normal operation, essentially in the manner described above.

Figure 5:
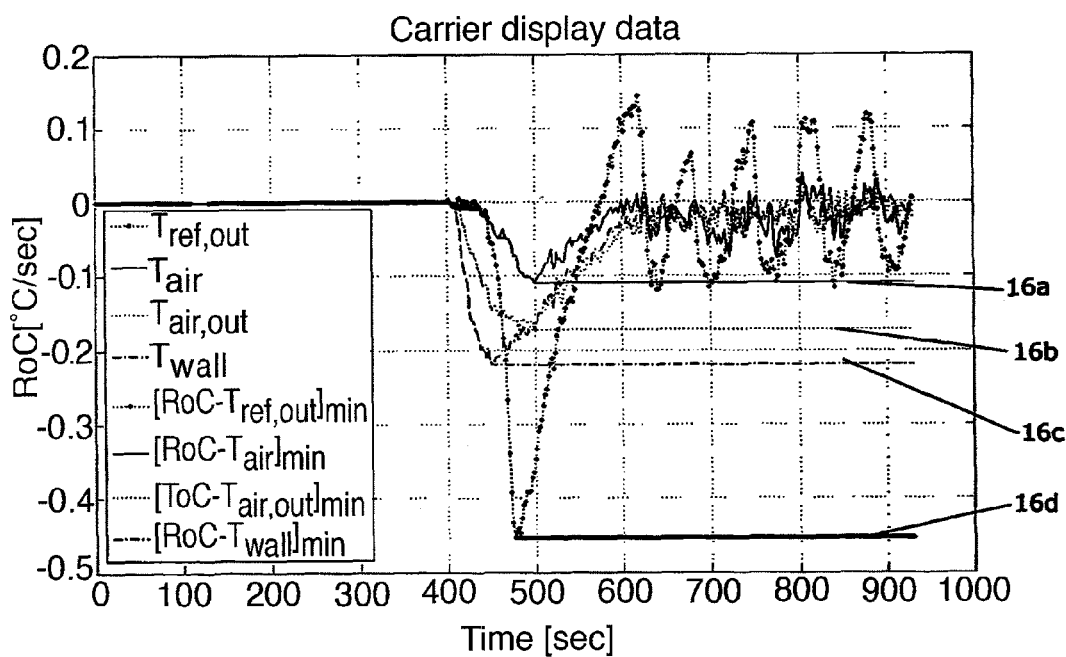
FIG. 5 is a graph illustrating rate of change of the temperatures illustrated in FIG. 4.

FIG. 5 is a graph showing the rate of change, i.e. the derivative with respect to time, of the temperature measurements shown in FIG. 4. The graph of FIG. 5 is very similar to the graph of FIG. 3.

Although the invention above has been described in connection with preferred embodiments of the invention, it will be evident for a person skilled in the art that several modifications are conceivable without departing from the invention as defined by the following claims.

What is claimed is:

1. A method for determining wire connections in a vapour compression system, the vapour compression system comprising a compressor, a condenser, an expansion device and an evaporator being fluidly interconnected in a refrigerant path, and two or more sensor devices arranged at different locations in the vapour compression system relative to the evaporator for measuring variables responsive to a mass flow of refrigerant through the evaporator, the variables being relevant for the operation of the vapour compression system, the method comprising the steps of:

changing a single operational setting for the vapour compression system, monitoring rates of change of variable values being measured by the at least two sensor devices at different locations in the vapour compression system relative to the evaporator in response to said single changed operational setting, each variable value being monitored by a sensor device of the at least two sensor devices having a dynamic response when the single operational setting is changed based at least in part on the mass flow of refrigerant through the evaporator so that said monitored rates of change of variable values being measured by the at least two sensors exhibit differing dynamical behavior in response to said single changed operational setting, comparing the monitored rates of change of the measured variable values to expected dynamical behavior of at least one variable measured by a sensor device in response to said single changed operational setting, and based on the comparing step, determining at least one wire connection of the vapour compression system when a mutual level of a minimum value of a monitored rate of change of a measured variable values of the monitored rates of change compared to minimum values of rates of change of other measured variable values of the monitored rates of change is the same as an expected mutual level of the expected dynamical behavior.

2. The method according to claim 1, wherein the step of determining at least one wire connection comprises determining at least one wire connection between a given sensor device and a control unit.

3. The method according to claim 1, wherein the step of determining at least one wire connection comprises determining at least one wire connection between an actuator connected to a component of the vapour compression system and a control unit.

4. The method according to claim 1, wherein the step of determining at least one wire connection comprises determining the position of at least one sensor device.

5. The method according to claim 1, wherein the step of changing an operational setting for the vapour compression system comprises changing an opening degree of the expansion device.

6. The method according to claim 1, further comprising the step of applying an electronic label to a determined wire connection.

7. The method according to claim 1, further comprising the step of, based on the comparing step, determining an error state of an actuator connected to a component of the vapour compression system.

8. The method according to claim 1, further comprising the step of obtaining a signature for the vapour compression system, said signature reflecting expected dynamical behavior of at least one variable measured by a sensor device in response to predefined changes in operational settings for the vapour compression system.

9. The method according to claim 1, wherein the step of monitoring variable values comprising monitoring at least two temperature parameters of the vapour compression system.

10. The method according to claim 1, further comprising the steps of:
changing an additional operational setting for the vapour compression system,
monitoring rates of change of variable values being measured by at least two sensor devices, in response to said changed additional operational setting,
comparing the rates of change of the measured variable values to expected dynamical behavior of at least one variable measured by a sensor device in response to said additional changed operational setting, and
based on the comparing step, determining at least one wire connection of the vapour compression system.

11. The method according to claim 1, wherein the two or more sensor devices arranged at different locations in the vapour compression system relative to the evaporator are for measuring variables responsive to the mass flow of refrigerant through the evaporator and an air flow over the evaporator; and
wherein the dynamic response of each variable value being monitored by a sensor device of the at least two sensor devices when the single operational setting is changed is based at least in part on the mass flow of refrigerant through the evaporator and the air flow over the evaporator so that said monitored rates of change of variable values being measured by the at least two sensors exhibit differing dynamical behavior in response to said single changed operational setting.

12. A method for determining wire connections in a vapour compression system, the vapour compression system comprising:
a compressor, a condenser, an expansion device, and
an indoor unit comprising:
an evaporator being fluidly interconnected in a refrigerant path with the compressor, condenser, and expansion device, and
two or more sensor devices arranged at different locations in the indoor unit relative to the evaporator for measuring variables responsive to at least one of a mass flow of refrigerant through the evaporator or an air flow over the evaporator, the variables being relevant for the operation of the vapour compression system, the method comprising the steps of:
changing a single operational setting for the vapour compression system,
monitoring rates of change of variable values being measured by the at least two sensor devices at different locations in the indoor unit relative to the evaporator in response to said single changed operational setting, each variable value being monitored by a sensor device of the at least two sensor devices having a dynamic response when the single operational setting is changed based at least in part on the mass flow of refrigerant through the evaporator or the air flow over the evaporator so that said monitored rates of change of variable values being measured by the at least two sensors exhibit differing dynamical behavior in response to said single changed operational setting,
comparing the monitored rates of change of the measured variable values to expected dynamical behavior of at least one variable measured by a sensor device in response to said single changed operational setting, and
based on the comparing step, determining at least one wire connection of the vapour compression system when a mutual level of a minimum value of a monitored rate of change of a measured variable values of the monitored rates of change compared to minimum values of rates of change of other measured variable values of the monitored rates of change is the same as an expected mutual level of the expected dynamical behavior.

* * * * *